United States Patent [19]

Yanagisawa et al.

[11] 4,126,303

[45] Nov. 21, 1978

[54] DASHPOT

[75] Inventors: Syozo Yanagisawa, Tokaimura; Tomo Itoh, Katsuta, both of Japan

[73] Assignee: Hitachi, Ltd., Japan

[21] Appl. No.: 685,534

[22] Filed: May 11, 1976

[30] Foreign Application Priority Data

May 16, 1975 [JP] Japan .................................. 50-57304

[51] Int. Cl.[2] .............................................. B60G 11/56

[52] U.S. Cl. .......................................... 267/34; 91/31; 92/59; 92/143; 138/30; 138/44; 188/298; 267/65 A

[58] Field of Search ................... 92/100, 8, 12, 59, 94, 92/143; 188/298; 123/103 R; 285/345; 91/31; 138/30, 44, 45 A; 267/34, 65 A

[56] References Cited

U.S. PATENT DOCUMENTS

| | | | |
|---|---|---|---|
| 2,782,025 | 2/1957 | Olson | 188/298 |
| 2,963,289 | 12/1960 | McFarland | 188/298 |
| 2,969,973 | 1/1961 | Scholz | 188/298 |
| 3,489,127 | 1/1970 | Keizo et al. | 123/103 R |
| 3,667,785 | 6/1972 | Kapeker | 285/345 |
| 3,721,222 | 3/1973 | Shioya | 123/103 R |
| 3,805,760 | 4/1974 | Yagi | 123/103 R |
| 3,921,672 | 11/1975 | Arnold | 138/44 |
| 3,955,834 | 5/1976 | Ahlrot | 285/345 |
| 3,965,223 | 6/1976 | Benjamin | 92/100 |

FOREIGN PATENT DOCUMENTS

| | | | |
|---|---|---|---|
| 331,310 | 7/1930 | United Kingdom | 285/345 |
| 1,141,462 | 1/1969 | United Kingdom | 285/345 |

*Primary Examiner*—Martin P. Schwadron
*Assistant Examiner*—Abraham Hershkovitz
*Attorney, Agent, or Firm*—Craig & Antonelli

[57] ABSTRACT

A dashpot wherein a fitting including a calibrated bleed orifice formed therein is detachably retained in a valve body which houses a check valve and forms a part of a diaphragm chamber.

9 Claims, 8 Drawing Figures

DASHPOT

BACKGROUND OF THE INVENTION

1. Field of the Invention

This invention relates to a dashpot for controlling and slowing down the closing motion of the throttle valve in the carburetors of internal-combustion engines for automobiles and the like. More particularly, the invention is concerned with a fitting including a calibrated bleed orifice formed therein, not in one piece with, but as a separate component of, the dashpot body.

2. Brief Description of the Prior Art

The prior art will now be briefly described in connection with the dashpots for gasoline engines. When engine acceleration is required of an automobile or the like, the throttle valve is opened. The subsequent closing of the valve, if done suddenly, would accompany the following two phenomena:

(1) Because gasoline has a larger density and develops greater inertia than each of air, the supply rate of air to the engine will decrease rapidly whereas that of gasoline will not.

(2) The sudden throttle closing will cause a sharp pressure drop in the air-fuel mixture passage on the downstream side of the throttle valve, which in turn will vaporize the gasoline that has wetted the manifold wall between the valve and the engine cylinders while the valve was open.

These phenomena will combinedly cause a prompt increase of the air-fuel mixture ratio or a temporal oversupply of gasoline for the amount of air required for combustion. This will result in incomplete combustion in the gasoline engine and hence large emissions of unburned gasoline, thermal decomposition products, carbon monoxide and other noxious substances. Should they be left out of control, the harmful emissions might well exceed the local regulation limits for anti-air pollution.

In an attempt at overcoming these difficulties, it has been customary to install a pneumatic dashpot on the closing side of the throttle valve so as to effect gradual and slow closing of the valve. Such a dashpot has a calibrated bleed orifice defined by a combination of a detachable needle and a ring-shaped opening, the cross sectional area of the opening being adjusted by the stroke of the needle.

The needle-type orifice has a rather small equivalent diameter, and the design limitations reduce the width of the flow passage to the range from 10 to 60$\mu$, so that the orifice can be clogged by fine dust in the air soon after use. If the orifice is clogged during operation, the dashpot will no longer work or the damping rate at the closing of the throttle valve will become much lower than expected. This will seriously affect the drivability of the vehicle at the time of deceleration or will extremely impair the engine brake effect upon releasing of the accelerator. In such an event the dashpot will have to be totally discarded and replaced by a new unit.

In order to eliminate this disadvantage, we tried to provide a fixed hole of predetermined dimensions for use as the bleed orifice of the dashpot. It was found that such a hole ranging in diameter from 0.1 to 0.3 mm gives a good result.

Like the needle-type, the fixed orifice is guarded by filters in front and in rear against the intrusion of dirt from the outside, and naturally the orifice is located rather deep in the dashpot assembly.

The afore-mentioned size and location of the fixed orifice involve the following drawbacks in the use of the dashpot having such an orifice:

(1) Since the orifice has a relatively small bore and is stationary in the dashpot, it is in the case of clogging not so easily cleaned as the needle type is. If the orifice is clogged, the entire dashpot will have to be replaced to an economic disadvantage. (with the needle type, cleaning is easier because the needle can be removed, leaving a relatively large bore behind.)

(2) The fixed orifice has a little too small bore and is located too deep in the dashpot to be machined or electrically processed conveniently for mass production.

SUMMARY OF THE INVENTION

It is an object of the present invention to provide a dashpot equipped with an economical fitting including a calibrated bleed orifice formed therein which is easy to clean or replace when clogged.

Another object of the invention is to provide a dashpot whose bleed orifice is easily machined or otherwise worked to permit mass production.

In accordance with the invention, there is provided a dashpot comprising a housing, a diaphragm of elastic material dividing the room in said housing into an atmospheric chamber and a diaphragm chamber, a rod connected at one end to said diaphragm and extending through said atmospheric chamber so that the other end is beyond said chamber, a valve body directly connected to said diaphragm chamber and having a valve mechanism for closing or opening the valve in response to an increase or decrease in the pressure of air in the diaphragm chamber due to the deformation of said diaphragm upon depression of said rod at the other end, said valve body having also a calibrated bleed orifice establishing communication between the atmosphere and said diaphragm chamber, a diaphragm spring disposed between said diaphragm and valve body and adapted to restore the diaphragm deformed by the depression of the other end of said rod to its original state, and a filter secured to said valve body to avoid ingress of dust from the outside into said calibrated bleed orifice, characterized in that a fitting has said calibrated bleed orifice formed therein and is detachably installed in said valve body.

Also, according to the invention, there is provided a dashpot comprising a housing, a diaphragm of elastic material dividing the room in said housing into an atmospheric chamber and a diaphragm chamber, a rod connected at one end to said disphragm and extending through said atmospheric chamber so that the other end is beyond said chamber, a valve body directly connected to said diaphragm chamber and having a valve mechanism for closing or opening the valve in response to an increase or decrease in the pressure of air in the diaphragm chamber due to the deformation of said disphragm upon depression of said rod at the other end, said valve body having also a calibrated bleed orifice establishing communication between the atmosphere and said diaphragm chamber, a diaphragm spring disposed between said diaphragm and valve body and adapted to restore the diaphragm deformed by the depression of the other end of said rod to its original state, and a filter secured to said valve body to avoid ingress of dust from the outside into said calibrated bleed orifice, characterized in that a fitting has said calibrated bleed orifice formed therein and is detachably mounted to said valve body through an elastic member.

DETAILED DESCRIPTION OF PREFERRED EMBODIMENTS

Figure 1:
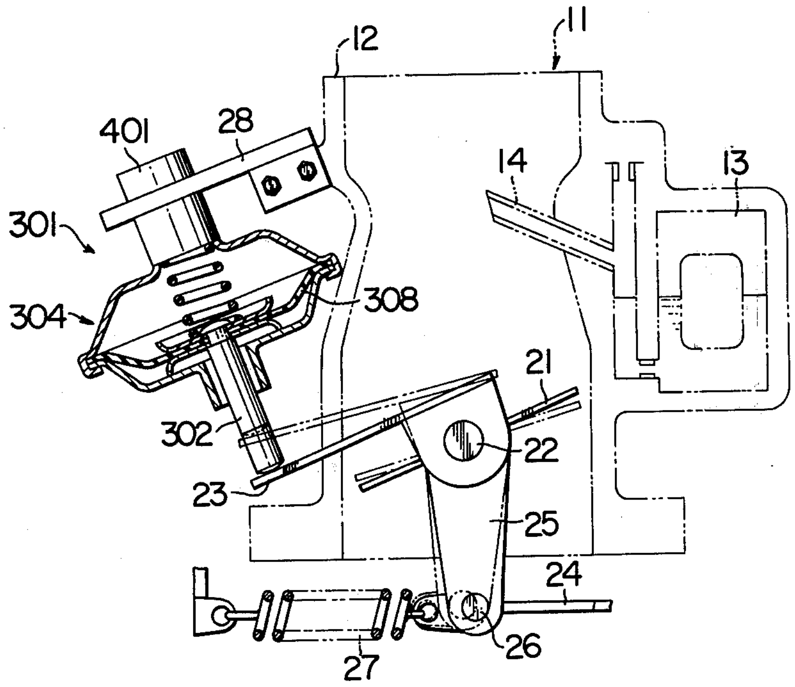
FIG. 1 is a schematic general view of a carburetor incorporating a dashpot according to the invention.

Referring to FIG. 1, there is shown an embodiment of the invention as incorporated in a typical automotive engine carburetor.

The carburetor, generally indicated by the numeral 11, comprises a carburetor body 12 having a venturi throat formed therein, a float chamber 13 filled with gasoline, and a nozzle 14 communicated with the float chamber 13 to supply the venturi throat with gasoline by virtue of the differential pressure across the venturi throat. A throttle valve 21 is fixedly mounted on a pivot pin 22, which in turn is rotatably held at both ends extending outwardly through the carburetor body 12 close to a portion of the manifold (not shown) below the venturi throat, so that the passage for air-fuel mixture on the downstream side of the venturi throat is opened and closed by the throttle valve 21.

To the portion of the throttle valve pivot pin 22 extending outwardly of the carburetor body 12 is fixed one end of a crank arm 25, the other end of which being pivotally connected to a crank arm pin 26. A throttle level 24 is connected to the crank arm pin 26, and the pin is connected to one end of a compression spring 27. The other end of the spring is anchored to the carburetor body 12 to bias the crank arm 25 for pivotal motion normally in the clockwise direction about the pin 25. A throttle linkage 23 is rigidly secured at one end to an outwardly projecting end portion of the throttle pivot pin 22 and is rotatable therewith.

A dashpot 301 is supported by a dashpot holder 28 made fast to the outer wall of the carburetor body 12, and a rod 302 of the dashpot 301 is abutted against the outer end of the throttle linkage 23 so as to damp the rotary motion of the throttle linkage 23 for the closing motion of the throttle valve 21. The dashpot 301 comprises essentially, in addition to the rod 302, a housing 304 and a valve body 401.

Figure 2:
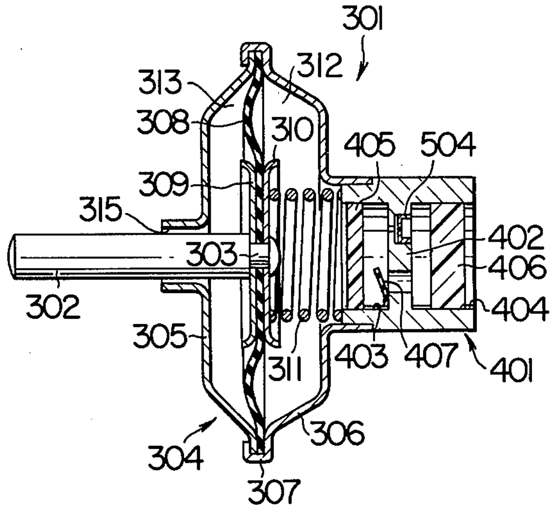
FIG. 2 is a cross sectional view of a dashpot embodying the invention.

The dashpot 301 will now be described in more detail with reference to FIG. 2.

Its housing 304 comprises a front half portion 305 including a passage 315 of an adequate size for air passing and for receipt of the rod 302 reciprocatably therethrough, and a rear half portion 306 connected in a pair with the front half portion 305, on the side opposite to the rod 302. A diaphragm 308 of rubber is disposed between these half portions and serves to divide the room inside the housing 304 into two, thus defining an atmospheric chamber 313 and a diaphragm chamber 312. The peripheral edge of the diaphragm 308 is held between those of the front and rear half portions 305, 306, and the sandwich structure is integrally clamped and caulked with a flange 307 of the rear half portion 306. The center portion of the diaphragm 308 is put between a pair of disk-shaped front and rear center plates 309, 310 located, respectively, on the side facing the rod 302 and on the opposite side. They are both secured, together with the diaphragm 308, to the rear end 303 of the rod 302 which extends axially movably through the front half portion 305 of the housing 304.

A valve body 401 is rigidly secured to the center of the rear half portion 306. Between the inner end of the valve body 401 and the rear center plate 310 is seated a diaphragm spring 311, which will serve to restore the diaphragm 308 to its original state upon its deformation by the pressure exerted by the outer end of the rod 302 in response to a movement of the throttle valve 21.

Now the valve body 401 will be described in more detail. With a front bore 403 and a rear bore 404 formed therein, the valve body 401 takes a cylindrical form having a disk plate 402 in the center. The valve body 401 is made fast to the near half portion 306 by welding or other jointing means. The disk plate 402 is provided with a check valve 407 and a fitting 504 including a calibrated bleed orifice.

The check valve 407 is designed to close upon a rise of air pressure in the diaphragm chamber 312 due to a push of the outer end of the rod 302 and to open upon reduction of the pressure due to releasing of the rod. On the other hand, the fitting 504 is formed with a calibrated bleed orifice 506 from 0.1 to 0.3 mm in diameter. When the air pressure in the diaphragm chamber 312 is raised the air will be allowed to escape gradually from the chamber to the atmosphere by way of this calibrated orifice.

In the front bore 403 and the rear bore 404 are fitted closely by bonding, respectively, a front filter 405 and a rear filter 406, both of foam plastics of connected-cell construction. The front filter 405 is intended to protect the fitting 504 against the ingress of metallic dust to be produced by the abrasion by mutual contact of the diaphragm spring 311, rear center plate 310, and valve body 401, whereas the rear filter 406 prevents from the entry of fine solids in the atmosphere for the fitting. The foam plastics may consist of phenol resin, polyurethane, polyvinyl acetal, polystyrene, polyethylene, cellulose or viscose, molded to be elastic members of numerous connected cells.

It is to an improvement in this fitting 504 that the present invention is directed. Some embodiments of the fitting of the invention will now be described in detail with reference to FIGS. 3 through 8.

Figure 3:
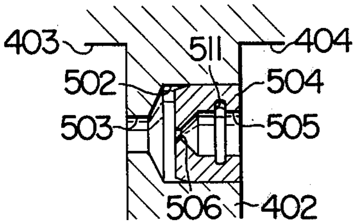
FIG. 3 is a fragmentary sectional view of a fitting having a calibrated bleed orifice, as incorporated in a dashpot in accordance with the invention.

As shown in FIG. 3, the disk plate 402 has an orifice inlet 503 and an adjoining metering bore 502 formed concentrically therethrough. Inside the metering bore 502 is press fitted, from the rear bore 404 side, a fitting 504 having a calibrated bleed orifice 506 and an adjoining orifice bore 505 formed concentrically therethrough. As noted above, the calibrated bleed orifice 506 is from 0.1 to 0.3 mm in diameter.

Figure 4:
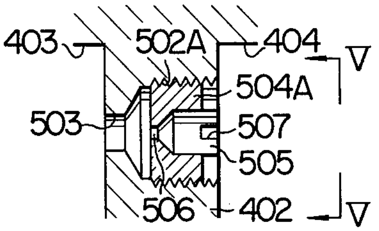
FIG. 4 is a fragmentary sectional view of a modified form of the fitting having a calibrated bleed orifice for use with the dashpot.
Figure 5:
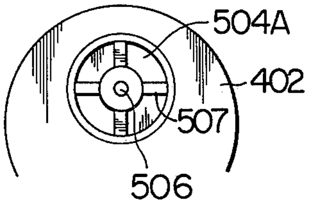
FIG. 5 is a view as seen in the direction of arrows V—V in FIG. 4.

In a modified form illustrated in FIGS. 4 and 5, a threaded bore 502A is provided in place of the metering bore 502 of FIG. 3, and a fitting 504A having a cross slit 507 and a thread therearound for engagement with the threaded bore 502A is screwed into the bore 502A. The cross slit 507 enables the fitting 504A to be easily removed by unscrewing with a screwdriver or the like.

Figure 6:
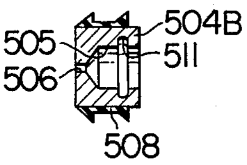
FIG. 6 is a fragmentary sectional view of another modification of the fitting having a calibrated bleed orifice for use with the dashpot.
Figure 7:
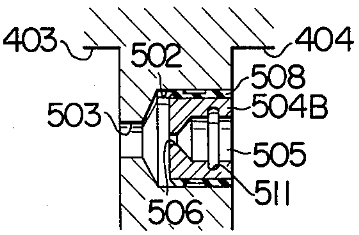
FIG. 7 is a fragmentary sectional view of the fitting shown in FIG. 6 as installed in the dashpot.

FIG. 6 shows another modified fitting 504B to the perphery of which is bonded an elastic sleeve 508 of an elastic material such as rubber or plastics. The elastic sleeve 508 is provided with a plurality of fins, each triangularly shaped in cross section and inclined toward the inserting end. The fins are designed to facilitate the insertion of the fitting 504B into the metering bore 502, keep the fitting from falling back into the rear bore 404, and avoid the formation of cuttings during the course of machining. FIG. 7 shows the fitting 504B of FIG. 6 fitted in the metering bore 502. The other parts are identical with those used in FIG. 3.

Figure 8:
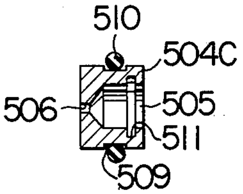
FIG. 8 is a fragmentary sectional view of still another modification of the fitting having a calibrated bleed orifice for use with the dashpot.

In still another modification illustrated in FIG. 8, a fitting 504C is formed with an annular groove 509 along its periphery, and an elastic ring 510, such as an O ring, is fitted in the groove 509. The assembly is placed in the metering bore 502 as shown in FIG. 7. While the elastic ring 510 is shown with a circular cross sectional contour, it is not a limitation to the invention. The ring may take any other configuration provided that the fitting 504C with the ring thereon can be easily introduced into the metering bore 502 and can hardly be pulled off into the rear bore 404. It may also be made of any suitable elastic material, such as rubber or plastics, in so far as it has a heat-resisting strength at temperature up to 100° C., which is the temperature of surroundings at gasoline engines.

In the fittings 504, 504B, 504C shown, respectively, in FIGS. 3, 6, 8, the cross slit 507 shown in FIGS. 4 and 5 is replaced by an annular notch 511. Each such notch is formed on the inner wall of the orifice bore 505 so that the fitting can be easily hooked and pulled out of the metering bore when necessary.

With the construction so far described, the dashpot according to the present invention operates in the following way. The full lines in FIG. 1 indicate that the throttle valve 21 has been opened by pulling the throttle lever 24 to increase the engine speed. As the throttle valve opens, the throttle linkage 23 turns counter-clockwise to lessen the load on the rod 302 and allows the diaphragm spring 311 to stretch. Then, as can be seen from FIG. 2, the check valve 407 opens to introduce air into the diaphragm chamber 312.

Upon releasing of the throttle lever 24, the throttle spring 27 pulls the crank arm 25, turning the throttle linkage 23 clockwise and thereby pushing the rod 302 upwardly. The final positions of the throttle valve 21 and the throttle linkage 23 after their movements are indicated by two-dot chain lines. The rod 302 thus pushes the diaphragm 308, as in FIG. 2, thereby reducing the volume of the diaphragm chamber 312 and increasing the air pressure therein. Next, the check valve 407 closes and air is gradually removed from the diaphragm chamber 312 only through the calibrated bleed orifice 506 of the fitting 504 into the atmosphere. Consequently the throttle valve can move on to the closed position with relative slowness.

In accordance with the present invention, the fitting 504 is made separate from the valve body 401, and therefore the drilling of the calibrated bleed orifice 506, which usually offers a bottleneck to quantity production of fittings, can be accomplished without difficulty. Cleaning of any clogged calibrated bleed orifice is readily done by removing the fitting 504 from the valve body 401. Also, because it is only necessary to replace the fitting 504 as a component of the valve body 401, instead of the entire dashpot assembly, improved economy is attained in the maintenance of the dashpot.

What is claimed is:

1. In a dashpot including:

(a) a housing;

(b) a diaphragm disposed in said housing;

(c) a diaphragm chamber disposed on one side of said diaphragm;

(d) a valve body connected to said housing on said one side of said diaphragm, said valve body having therethrough at least one metering bore of one cross-sectional dimension for establishing communication between the outside atmosphere and said diaphragm chamber;

(e) a check valve disposed in said valve body;

wherein the improvement comprises:

a detachable fitting of a second cross-sectional dimension smaller than said one cross-sectional dimension of said at least one metering bore through said valve body, said fitting being disposed in said at least one metering bore through said valve body, said fitting having a calibrated bleed orifice formed therein, said fitting further having means for securing said fitting in said valve body, and said fitting further having means for detaching said fitting from said at least one metering bore through said valve body without detaching said valve body from said housing, wherein said fitting is detachably secured in said at least one metering bore through said valve body by way of an elastic member.

2. The dashpot according to claim 1, wherein said elastic member is a sleeve of elastic material having fins of triangular cross sectional contour.

3. The dashpot according to claim 2, wherein said sleeve of elastic material has at least two fins and is mounted directly on a periphery of the fitting.

4. The dashpot according to claim 1, wherein said elastic member is an O ring.

5. In a dashpot including a housing, diaphragm of elastic material dividing the room in the housing into an atmospheric chamber and a diaphragm chamber, a rod movably connected at one end to the diaphragm and extending through the atmospheric chamber so that the other end of said rod is beyond the atmospheric chamber, a valve body directly secured to the diaphragm chamber and having check valve means for closing or opening a passage of the valve body by which the diaphragm chamber communicates with the outside atmosphere in response to a pressure in the diaphragm chamber due to a deformation of the diaphragm upon a movement of the rod at the other end, a diaphragm spring disposed in the diaphragm chamber between the diaphragm and the valve body and adapted to restore the diaphragm deformed by the movement of the other end of the rod to its original state, and a filter secured to the valve body to avoid the blockage of the valve body by dust and other impurities, the improvement comprising a fitting detachably installed in the valve body, said fitting having a calibrated bleed orifice formed therein, said fitting having an orifice bore adjoining the calibrated bleed orifice with the outside atmosphere, said calibrated bleed orifice having a flow passage area less than and a flow passage length shorter than the adjoining orifice bore, and said fitting further having a means for attaching said fitting to and for detaching said fitting from the valve body, wherein said fitting is detachably installed in the valve body by an elastic O-ring member.

6. In a dashpot including a housing, a diaphragm of elastic material dividing the room in the housing into an atmospheric chamber and a diaphragm chamber, a rod movably connected at one end to the diaphragm and extending through the atmospheric chamber so that the other end of said rod is beyond the atmospheric chamber, a valve body directly secured to the diaphragm chamber and having check valve means for closing or opening a passage of the valve body by which the diaphragm chamber communicates with the outside atmosphere in response to a pressure in the diaphragm chamber due to a deformation of the diaphragm upon a movement of the rod at the other end, a diaphragm spring disposed in the diaphragm chamber between the diaphragm and the valve body and adapted to restore the diaphragm deformed by the movement of the other end of the rod to its original state, and a filter secured to the valve body to avoid the blockage of the valve body by dust and other impurities, the improvement comprising a fitting detachably installed in the valve body, said fitting having a calibrated bleed orifice formed therein, said fitting having an orifice bore adjoining the calibrated bleed orifice with the outside atmosphere, said calibrated bleed orifice having a flow passage area less than and a flow passage length shorter than the adjoining orifice bore, and said fitting further having a means for attaching said fitting to and for detaching said fitting from the valve body, wherein said fitting is detachably installed in the valve body by a sleeve of elastic material having at least two spaced-apart fins of triangular cross-sectional contour.

7. In a dashpot including:

(a) a housing;

(b) a diaphragm disposed in said housing;

(c) a diaphragm chamber disposed on one side of said diaphragm;

(d) a valve body connected to said housing on said one side of said diaphragm, said valve body having therethrough at least one metering bore of one cross-sectional dimension for establishing communication between the outside atmosphere and said diaphragm chamber;

(e) a check valve disposed in said valve body; wherein the improvement comprises;

a detachable fitting of a second cross-sectional dimension smaller than said one cross-sectional dimension of said at least one metering bore through said valve body, said fitting being disposed in said at least one metering bore through said valve body, said fitting having a calibrated bleed orifice formed therein, said fitting further having means for securing said fitting in said valve body, and said fitting further having means for detaching said fitting from said at least one metering bore through said valve body without detaching said valve body from said housing, wherein said detaching means is a recess formed in an orifice bore of said fitting, said orifice bore adjoining said calibrated bleed orifice with the outside atmosphere.

8. The dashpot according to claim 7, wherein the recess formed in the orifice bore is an annular notch means for engaging a hooking means.

9. The dashpot according to claim 7, where the recess formed in the orifice bore is a cross slit means for engaging an unscrewing means.

* * * * *